United States Patent [19]

Stuhler

[11] Patent Number: 5,061,224
[45] Date of Patent: Oct. 29, 1991

[54] VARIABLE SPEED BICYCLE AUTOMATIC TORQUE CONVERTER TRANSMISSION

[76] Inventor: William B. Stuhler, 1908 Edgewater, Plano, Tex. 75080

[21] Appl. No.: 569,989

[22] Filed: Aug. 20, 1990

[51] Int. Cl.$^5$ .............................................. F16H 7/00
[52] U.S. Cl. ....................................... 474/84; 474/86; 474/89
[58] Field of Search .................................... 474/84–89, 474/101, 134, 80; 180/205, 219, 223

[56] References Cited

U.S. PATENT DOCUMENTS

| | | | |
|---|---|---|---|
| 2,560,991 | 7/1951 | Schuricht | 474/89 X |
| 2,633,030 | 3/1953 | Colden | 474/88 |
| 4,397,369 | 8/1983 | Read | 474/89 X |
| 4,712,789 | 12/1987 | Brilando | 474/86 X |

Primary Examiner—Thuy M. Bui
Attorney, Agent, or Firm—Warren H. Kintzinger

[57] ABSTRACT

A fully automatic torque converter transmission is presented that uses a "V" belt with inner teeth that engage mating teeth on a variable pitch pulley core in a low speed high torque state transformable into an infinitely variable higher speed shift mechanism. The bicycle pedal sprocket drives a pivoted cluster of three small sprockets with a drive chain loop interconnect driving a first sprocket as a driven member, and the other two serving as idlers in maintaining the chain at constant length. A speed ratio of approximately 1:6 from the pedal sprocket to the driven sprocket optimizes torque transmission capacity of the system with the driven sprocket attached to a self-centering, spring loaded, variable pitch pulley. This pulley has a core shaped like a timing belt pulley with grooves (or teeth) at its surface. The "V" belt driven by the variable pitch pulley drives a timing belt type pulley that rotates on a center fixed relative to the bicycle frame, and is a "V" belt with teeth on its inner surface enabling engagement with the variable pitch pulley core at the low speed high torque position. This converts the friction "V" belt drive to a positive drive in low gear. The driven pulley, finally, drives the rear wheel through a conventional bicycle chain.

20 Claims, 4 Drawing Sheets

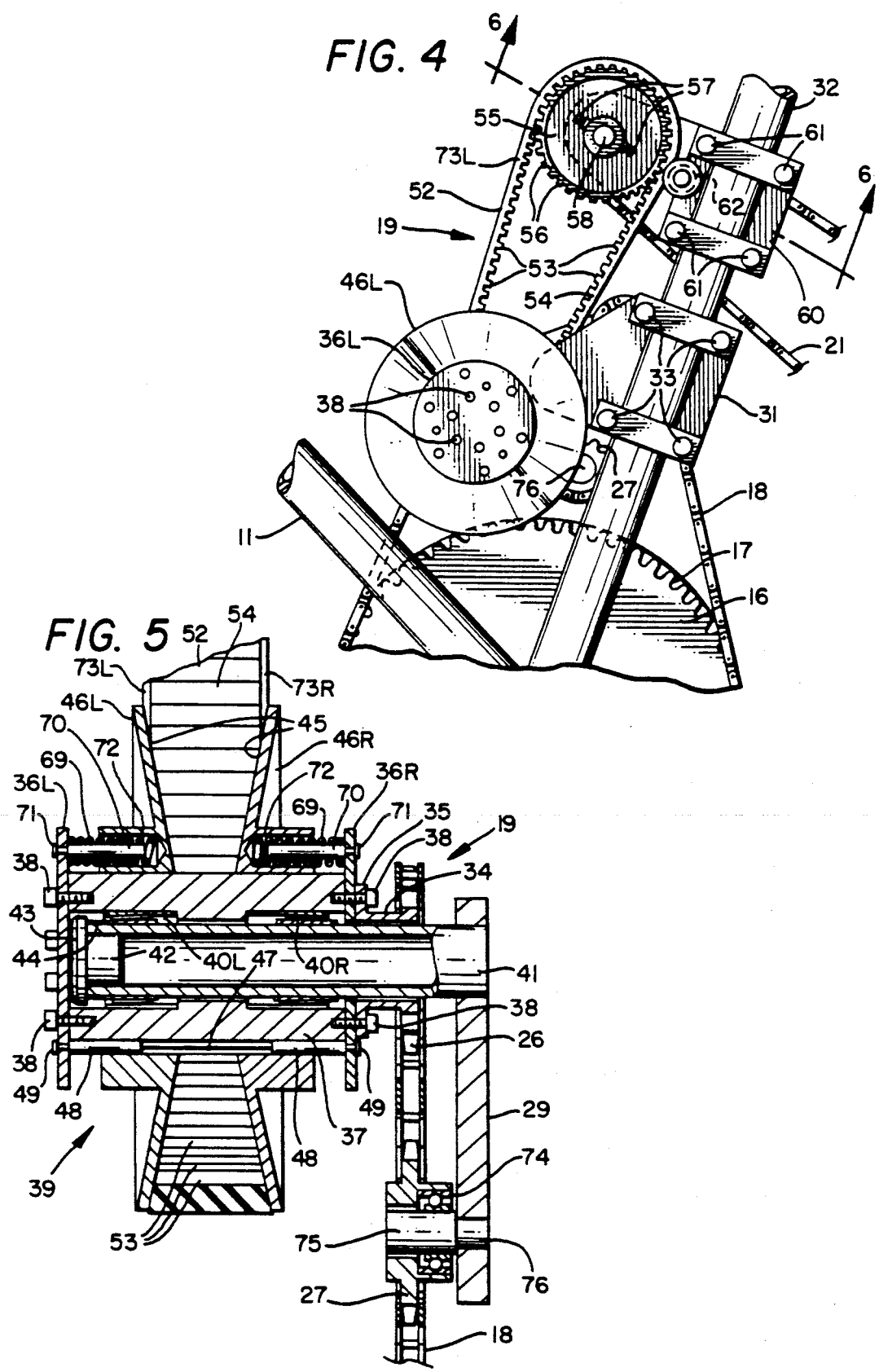

VARIABLE SPEED BICYCLE AUTOMATIC TORQUE CONVERTER TRANSMISSION

BACKGROUND OF THE INVENTION

This invention relates in general to bicycle variable speed transmission systems, and more particularly, to a fully automatic torque converter transmission having a low speed high torque positive drive state transformable into an infinitely variable higher speed shift mechanism.

There have been efforts in the past to provide variable drive bicycle transmissions in place of stepped speed bicycle transmissions such as the traditional "Ten-Speed Derailleur". Such efforts are typified by the "Variable Drive Bicycle Transmission" U.S. Pat. No. 3,972,244 of which I am a co-inventor, that varies the mechanical advantage via use of a "V" belt fixed pitch sheave rotatably mounted on the bicycle frame and a variable pitch sheave interconnected by a "V" belt. The rotation of the variable pitch sheave by action of the pedal sprocket in this structure causes the movement of the variable pitch sheave relative to the fixed pitch sheave to vary the mechanical advantage therebetween. Use of a second "V" belt sheave adds belt to sheave friction losses incurred thereby and there is no positive drive in any drive speed state of this transmission. Applicant's new transmission offers the consumer an excellent alternative to the traditional "Ten-Speed Derailleur" in having a fully automatic torque converter transmission with a new combination "V" and internally toothed belt, both variable and positive drive, combined with an infinitely variable automatic shift mechanism. Instead of having to manipulate multiple levers to obtain the proper speed ratio, one simply pedals the bicycle at a preferred rate of effort with the fully automatic transmission adjusting its speed ratio instantaneously to match grade variations. This is continuously accomplished without it being necessary to momentarily reduce effort in order to "shift", as is necessary with manual transmissions. The torque to time curve with my new transmission is smooth with degree of effort required by the bicycle user being smooth and easy with the effort level determined solely by him whereas it is necessary to momentarily reduce effort in order to "shift", as is necessary with multi-speed transmissions requiring manual shift. Enhanced bicycle safety is also an important consideration in that the new transmission in being fully automatic and continually self adjusting does not divert the rider's attention from traffic in order to shift complicated levers. A bicycle equipped with the new transmission is an excellent exerciser for controlled programs where momentary bursts of physical effort and/or strain are to be avoided.

It is therefore, a principal object of this invention to provide a fully automatic torque converter transmission having low speed positive drive combined with infinitely variable automatic smooth transition shift thereabove for bicycles.

Another object is to provide with such a bicycle transmission elimination of having to manipulate multiple levers to multiple positions to obtain proper speed drive ratios.

A further object is to provide such a bicycle transmission with one simply pedalling a bicycle at a preferred rate of effort with the fully automatic transmission adjusting its speed ratio instantaneously to match grade variations.

Still another object with such a bicycle transmission is greatly enhanced safety with the new transmission being fully automatic and continually self adjusting not diverting the rider's attention from traffic in order to shift complicated levers.

Another object is to provide an excellent bicycle exerciser for controlled health exercise programs where momentary bursts of physical effort and/or strain are to be avoided.

Features of the invention useful in accomplishing the above objects include, in a positive drive to variable speed bicycle automatic torque converter transmission, a fully automatic torque converter transmission using a "V" belt with inner teeth that engage mating teeth on a variable pitch pulley core in a low speed high torque state transformable into an infinitely variable higher speed shift mechanism. The bicycle pedal sprocket drives a pivoted cluster of three small sprockets with a drive chain loop interconnect driving a first sprocket as a driven member, and the other two serving as idlers in maintaining the chain at constant length. A speed ratio of approximately 1:6 from the pedal sprocket to the driven sprocket optimizes torque transmission capacity of the system with the driven sprocket attached to a self-centering, spring loaded, variable pitch pulley. This pulley has a core shaped like a timing belt pulley with grooves (or teeth) at its surface. The "V" belt driven by the variable pitch pulley drives a timing belt type pulley that rotates on a center fixed relative to the bicycle frame, and is a "V" belt with teeth on its inner surface enabling engagement with the variable pitch pulley core at the low speed high torque position. This converts the friction "V" belt drive to a positive drive in low gear. The driven pulley, finally, drives the rear wheel through a conventional bicycle chain. When torque applied to the bicycle pedal sprocket increases, the sprocket cluster tries to rotate about its axis with the tangential force appled by the chain thereby increasing the center distance between the variable pitch pulley and the fixed pulley. The "V" belt expands the variable pitch pulley to correspondingly change the ratio of the power transmission with a power drive transmission having all the characteristics of an infinitely variable torque converter. When torque increases, the transmission "shifts down", when torque is reduced, the transmission automatically "shifts back up" with the geometry of the transmission readily adaptable to a conventional bicycle frame. It can provide a shift range equivalent to a ten-speed "Deraillour" transmission without the need for shift levers, cables, etc. Operation is totally automatic and does not require the bike rider's attention, an important safety feature in bicycle operation. Using different springs in the variable pitch pulley enables the unit to be "customized" to suit different bike riders preference.

A specific embodiment representing what is presently the best mode of carrying out the invention is illustrated in the accompanying drawings.

BRIEF DESCRIPTION OF THE DRAWING

FIG. 4, a partial cut away detail opposite side elevation view from the view of FIG. 2 showing additional transmission detail;

FIG. 5, a partial cut away and sectioned view taken along line 5—5 of FIG. 3 of the spring loaded variable pitch pulley, the variable speed combination "V" and internally toothed positive drive belt in a high speed low torque state;

DESCRIPTION OF THE PREFERRED EMBODIMENT

Figure 1:
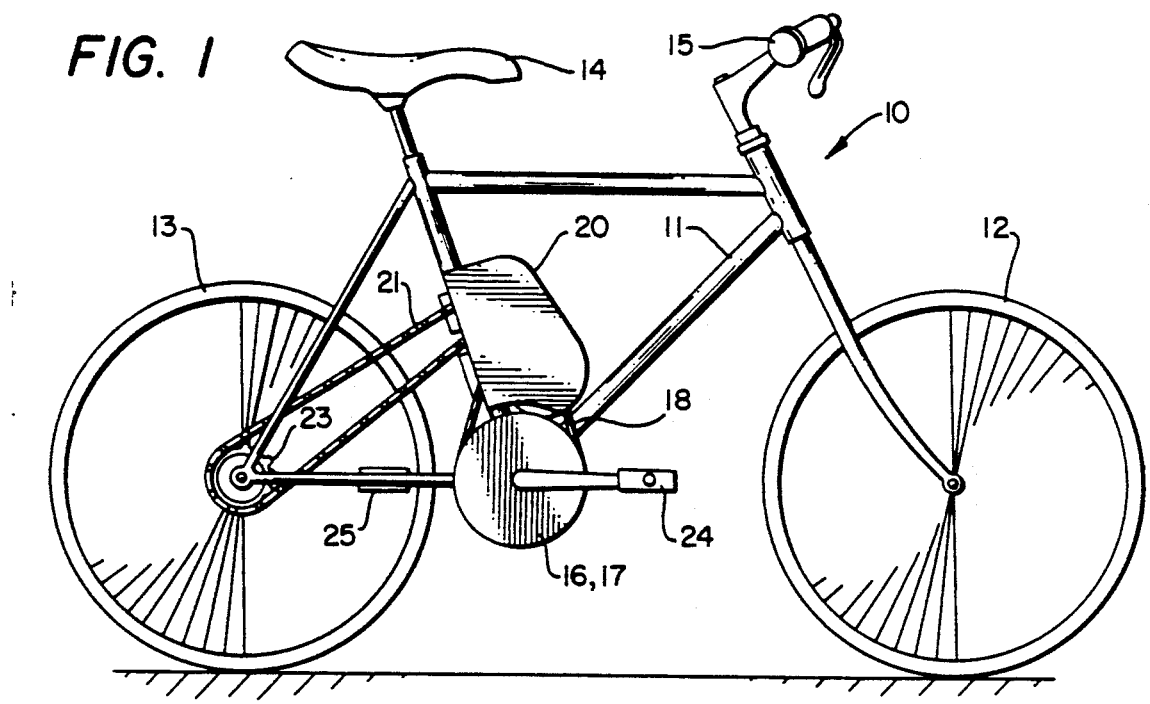
FIG. 1 represents a side elevation view of a bicycle equipped with the new variable speed automatic torque converter transmission.

A bicycle 10 is shown in FIG. 1 having a frame 11 interconnecting a front wheel 12 and a rear driven wheel 13 and mounting a users seat 14, handle bar 15 and drive pedal structure 16. The drive pedal structure 16 has a toothed drive sprocket 17 drive chain 18 connected to a variable drive transmission 19 (referring also to FIGS. 2-7) behind a protective cover 20. A conventional bicycle chain 21 extends from transmission output sprocket 22 to rear wheel 13 drive sprocket 23. Drive torque imparted from the user's feet to pedals 24 and 25 drives sprocket 17 and through drive chain 18 a cluster of three small sprockets 26, 27 and 28 pivotally mounted on plate 29. Plate 29 is, in turn, pivotally mounted for pivotal movement about pivot mount structure 30 on sprocket cluster mount bracket 31 that is secured in place on frame member 32 by bolts 33. The bicycle pedal sprocket 17 drives the pivoted cluster of three mall sprockets 26, 27, and 28 with the drive chain 18 interconnect driving the first sprocket 26 as a driven member, and the other two sprockets 27 and 28 serving as idlers in maintaining the chain 18 at constant length. A speed ratio of approximately one to six from the pedal sprocket 17 to the driven sprocket 26 optimizes torque transmission capacity of the system. The driven sprocket 26 is drive connected via tube 34 and flange 35, that is fastened to a hub plate 36R and hub member 37 by bolts 38 in the hub structure mounting of a self centering spring loaded, variable pitch pulley 39. Hub plate 36L is fastened to hub member 37 by additional bolts 38 and the hub member 37 with internal needle (or roller) bearings 40L and 40R is rotatably mounted on spindle tube 41, non rotatably fixed to plate 29, with combination nylon keeper and thrust bearing 42 a press fit into the outer end of spindle tube 41. The head flange 43 engages the outer end of the inner face 44 of needle bearing 40L as the keeper therefor.

The variable pitch pulley 39 mirror image inner bevel surfaced 45 sheave members 46L and 46R are mounted for inward and outward sliding relative movement on hub member 37 that is formed with an outer toothed surface 47. Each of the hub plates 36L and 36R mount three rods 48, riveted 49 thereto, that extend into grooves of the toothed surface 47 and partially into grooves 50 in the inner openings 51 of sleeve members 46L and 46R to prevent relative rotation thereof on hub member 37 while permitting relative longitudinal movement therebetween. The variable pitch pulley 39 is unusual in that the hub member 37 is tooth surface shaped like a timing belt pulley. With this structure a "V" belt 52 is used having teeth on its inner surface 54 that engage the variable pitch pulley hub (or core) member 37 converting the "V" belt 52 friction drive to a positive drive in low gear. This prevents slippage when maximum torque is applied to pedal sprocket 17 in drive through the transmission 19 to fixed position drive pulley 55 having teeth 56 in a timing belt like drive engagement with the inner teeth 53 of "V" belt 52. Pulley 55 is fixed by bolts 57 in place on pulley and sprocket 22 shaft 58, rotatably mounted by bearing 59 in bracket assembly 60 mounted in place on frame member 32 by bolts 61. A small diameter roller 62 rotatably mounted on combination roller shank 63 and threaded 64 end bolt 65 helps insure proper entry of belt teeth 53 of "V" belt 52 into drive engagement with teeth 56 of pulley 55. Bolt 66 in hub 67 of sprocket 22 fixes sprocket 22 on extension 68 of pulley and sprocket shaft 58 to the opposite side of bearing 59 from pulley 55.

The variable pitch pulley 39 opposite side sheeve members 46L and 46R are each resiliently spring biased toward each other by a plurality of resiliently compressed springs 69 mounted on spring mounting pins 70 riveted 71 to hub plates 36L and 36R, respectively, and extending into sheave member openings 72. The springs 69 resiliently bias the sheeve members 46L and 46R toward each other with inner beveled surfaces 45 thereof bearing, respectively, against the sloped sides 73L and 73R of the "V" belt 52 in a self-centering, spring loaded, variable pitch pulley 39 action from the low speed high torque positive drive state of FIGS. 2 and 4, automatically, through an infinite range of higher speed lower torque varying speed settings to the high speed low torque setting of FIGS. 3 and 5. Idler sprocket 27 is rotationally mounted by a bearing 74 on a spindle shaft 75 in turn having an extension 76 mounting in pivot plate 29, and idler sprocket 28 is rotationally mounted in like manner on pivot plate 29 (detail not shown). Please note that bearing 74 is shown as a single race bearing it more likely would be a two ball race bearing or roller bearing for stability purposes.

Figure 2:
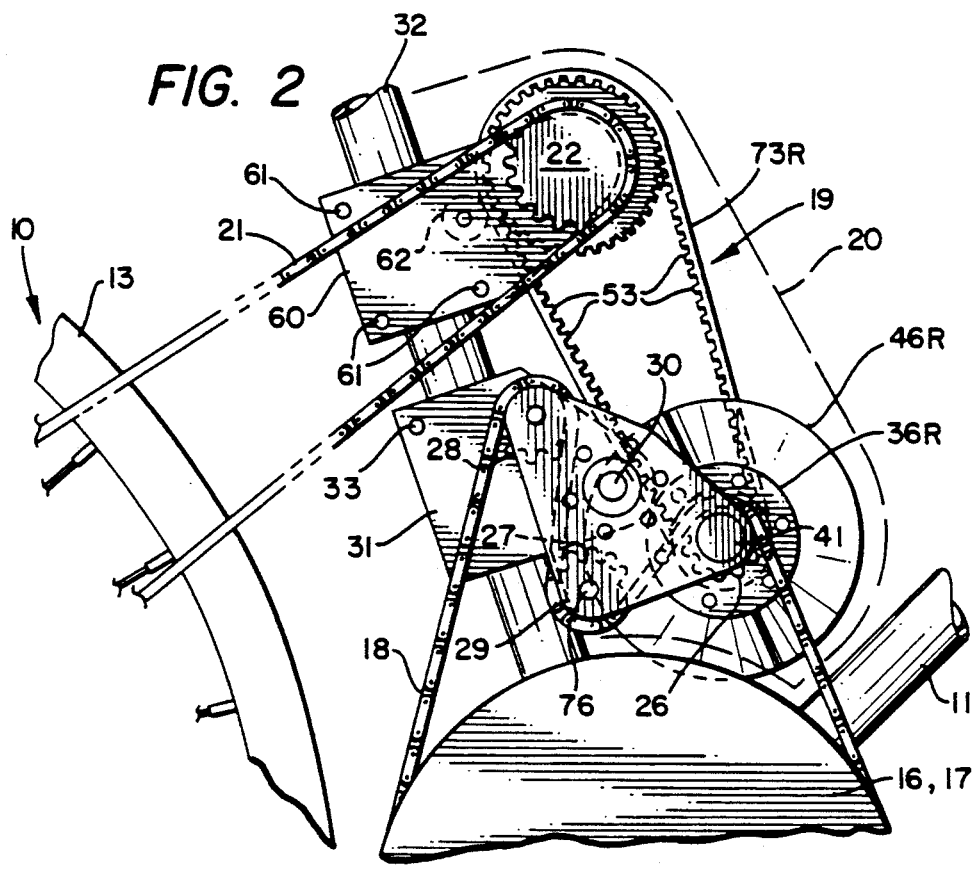
FIG. 2, a partial cut away detail side elevation view of the new transmission as installed in a bicycle with the protective cover in phantom for detail visibility and with the transmission in the low speed high torque positive drive state.
Figure 3:
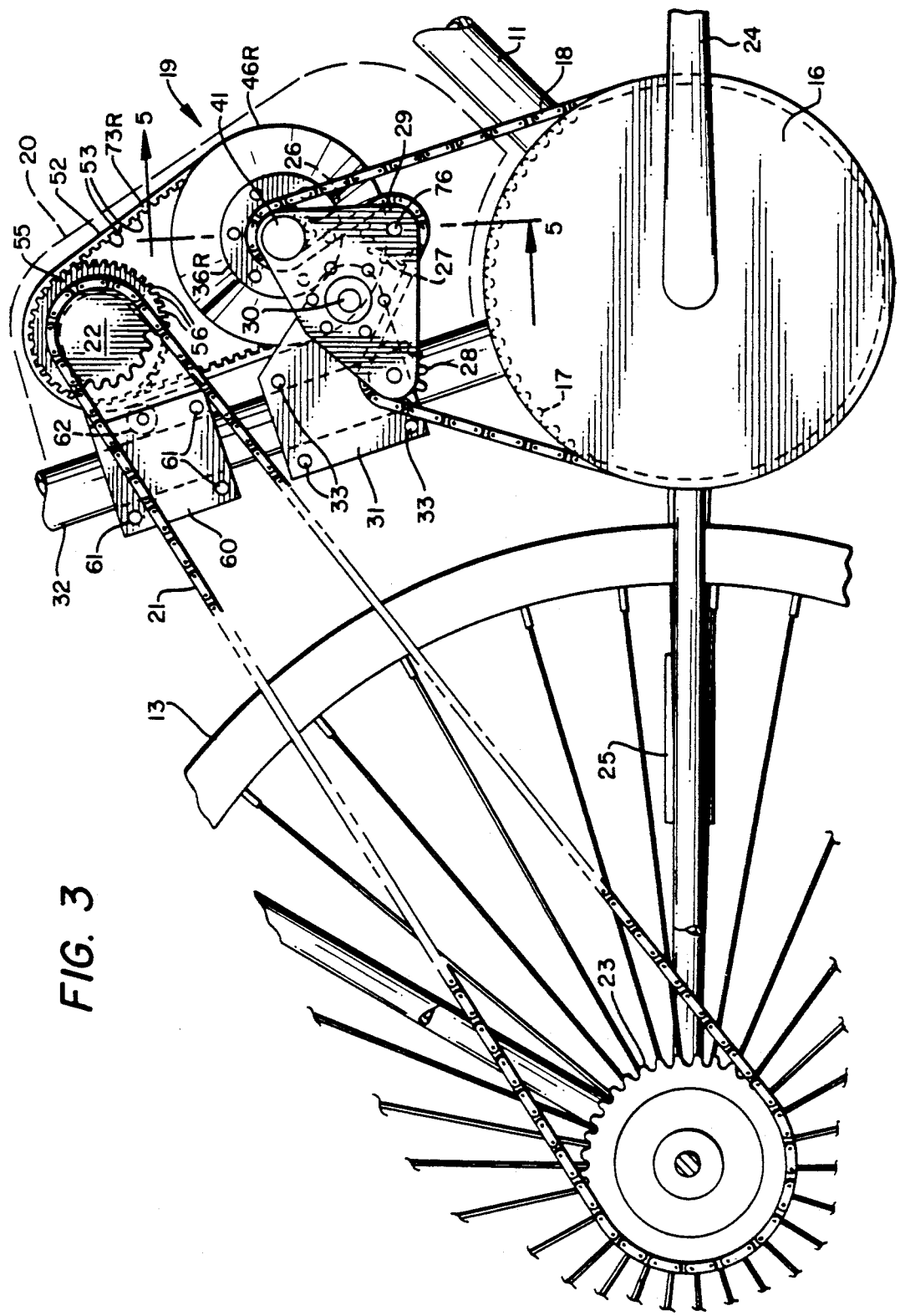
FIG. 3, a partial cut away detail side elevation view like FIG. 2 with, however, the transmission in the high speed low torque automatic converter state.
Figure 7:
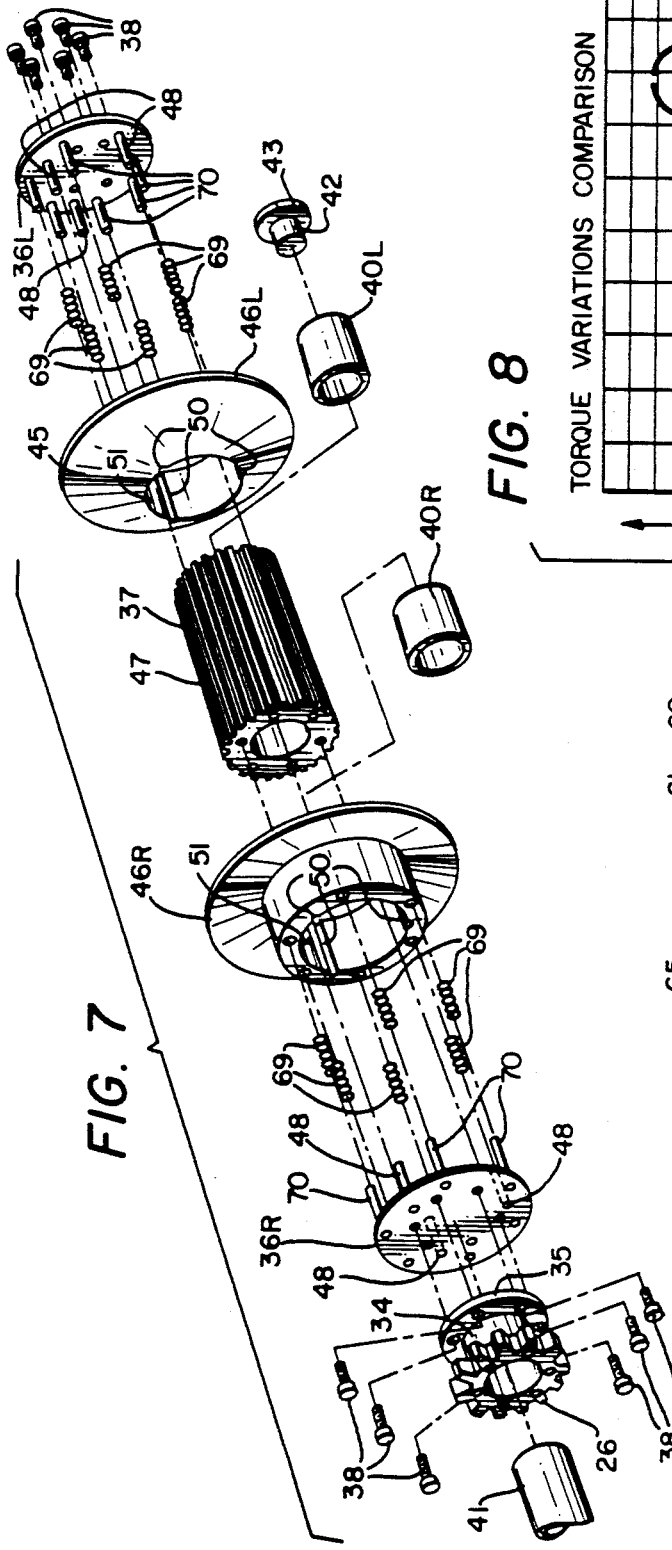
FIG. 7, an exploded perspective view of the spring loaded variable pitch pulley and chain drive sprocket assembly of FIG. 5; and, FIG. 8, a torque variations comparison graph of a bicycle with the new transmission and a multi-speed ten shift speed "Deraillour" transmission taken through one shift both through generally the same torque to time range.

It should be noted that when greater driving torque is applied to the pedals by a rider the "V" belt 52 with increasing torque will move progressively inward from the low torque high speed state of FIGS. 3 and 5 to ultimately the low speed high torque positive drive state of FIGS. 2 and 4. As "V" belt 52 moves inward from the outermost state of FIGS. 3 and 5 the unit area loading of "V" sloped sides 73L and 73R on opposite side sheeve member beveled surfaces 45 increases for two reasons; the area of side contact lessens and the resilient bias force of springs 69 increases with increasing compression thereof as the sheeve members 46L and 46R are increasingly forced apart by the "V" belt. Please note further that the inner ends 77 of rods 48 are sufficiently spaced so as to not interfere with the belt 52 teeth 54 coming into full meshed engagement in positive drive with the toothed surface 47 of hub member 37 in the low speed high torque positive drive state of FIGS.

Figure 8:
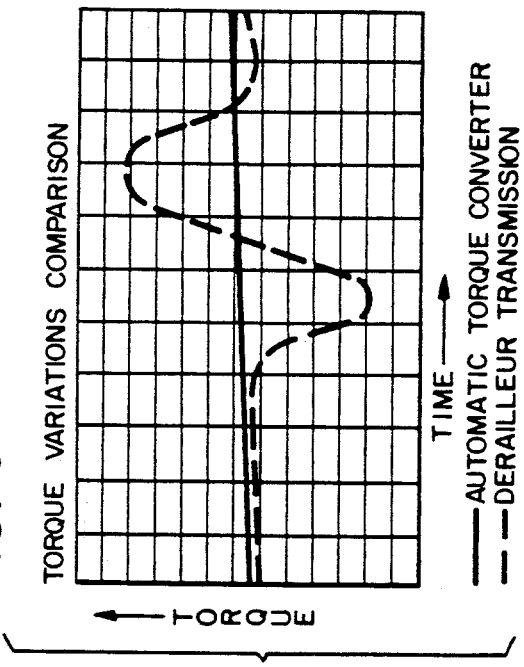
Figure 6:
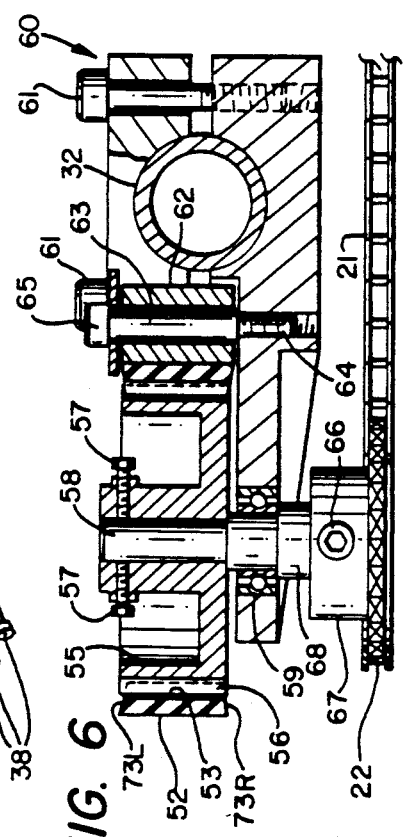
FIG. 6, a partial detail cut away and sectioned view taken along line 6—6 of FIG. 4 showing positive drive belt tooth driven pulley, in turn, drive connected to a conventional bicycle chain driving the rear bicycle wheel.

2 and 4. A torque variations comparison graph of FIG. 8 demonstrates the relatively smooth torque drive characteristics with applicant's positive drive to infinitely variable shift mechanism with a rider simply pedaling the bicycle at a preferred rate of effort with the fully automatic transmission adjusting its speed ratio instantaneously to match grade variations. A Devailler type transmission is shown to have shift point inherent torque variations dropping down and then rising sharply and then down again before returning to a reasonable torque rate.

This positive drive to variable speed automatic torque converter transmission while shown in a bicycle installation could be installed in other rider propelled vehicles or power motor driven vehicles, and industrial uses.

To reiterate the pedal sprocket drives a pivoted cluster of three small sprockets. The first sprocket is the "driven" member. The other two serve as idlers to maintain the chain at constant length. The speed ration from the pedal sprocket to the driven sprocket is approximately 1:6 to maximize torque transmission capacity of the system. The "driven" sprocket is attached to a self-centering, spring loaded, variable pitch pulley. This pulley is unique in that its core is shaped like a timing belt pulley. That is it has grooves (or teeth) in its surface. A special belt is used to connect the variable pitch pulley to a timing belt type pulley which rotates on a center which is fixed relative to the bicycle frame. The special belt is a "V" belt with serrations, or teeth, on its inner surface. The serrations engage the variable pitch pulley core at the "low speed" position. This converts the friction drive to a "positive drive" in low gear and prevents slippage when maximum torque is applied to the pedal sprocket. The driven pulley, in turn, drives the rear wheel through a conventional bicycle chain.

When torque applied to the pedal sprocket increases, the sprocket cluster tries to rotate about its pivot axis due to the tangential force applied by the chain. This, in turn, increases the center distance between the variable pitch pulley and the fixed pulley. The "V" belt expands the variable pitch pulley, thereby changing the ratio of the power transmission. In other words, the power transmission has all the characteristics of an "Infinitely variable torque converter". When torque increases, the transmission "shifts down", when torque is reduced, the transmission automatically "shifts back up". The geometry of the transmission is readily adaptable to a conventional bicycle frame. It can provide a shift range equivalent to a 10-speed "Deraillour" transmission without the need for shift levers, cables, etc. Operation is totally automatic and does not require the bike riders' attention, proving an important safety feature to the bicycle. Using different springs in the variable pitch pulley, the unit may be "customized" to suit different bike riders preference by installing different resilient bias rate springs 69 to match torque drive to the abilities of the user. It may also be used effectively for rehabilitation/exercise programs by limiting strain required to operate the bicycle.

Whereas this invention has been described primarily with respect to a single embodiment thereof, it should be realized that various changes may be made without departing from the essential contributions to the art made by the teachings hereof.

I claim:

1. A variable speed automatic torque converter transmission convertible from a low speed high torque state up into infinitely variable progressively lower torque higher speed settings comprising: a "V" belt with inner teeth; an output toothed pulley that rotates on a center fixed relative to the transmission mounting that is in continuous toothed engagement with the inner teeth of said "V" belt; a variable pitch pulley with opposite side mirror image bevelled side sheeve members engaged by the beveled side edges of said "V" belt and mounted on a hub member in rotationally fixed position for rotation with said hub member and longitudinally moveable back and forth in a self centering resiliently biased centering action; resilient biasing means on a hub structure for each of said sheeve members mounted to bias said sheeve members toward each other between an outermost high torque low speed setting thereof to an innermost low torque high speed setting thereof; said hub member having an outer toothed surface engaged by the inner teeth of said "V" belt when said variable pulley sheeves are in the outermost high torque low speed setting in positive drive, and when moved toward each other transformation through an infinitely variable speed range therefrom to the innermost low torque high speed setting thereof; said hub member being mounted on a pivotal mount member for adjusting to "V" belt length variations between shorter to longer pulley hub to variable pulley hub center spacing; sprocket means drive fixed to said variable pulley hub member; a drive sprocket connected through a drive chain to said sprocket means; and power drive means connected to said drive sprocket.

2. The variable speed automatic torque converter transmission of claim 1, wherein said opposite side sheeve members of said variable pitch pulley are maintained in rotationally fixed position for rotation with said hub member by key means between each of said sheeve members and said hub member.

3. The variable speed automatic torque converter transmission of claim 1, wherein said resilient bias means includes a plurality of resiliently compressible springs for each sheeve member biasing the sheeve members toward each other.

4. The variable speed automatic torque converter transmission of claim 3, wherein hub plates are mounted to each end of said hub member; a plurality of spring mounting pins connected to each hub plate; and with the springs mounted on respective spring mounting pins extended into openings in the hub section of the opposite side sheeves and resiliently compressed between respective sheeve members and the adjacent hub plates.

5. The variable speed automatic torque converter transmission of claim 2, wherein said sheeve to hub member key means for each side are short enough so as to not interfere with toothed engagement of the internal teeth of said "V" belt with teeth of said hub member when said "V" belt is moved to the high torque low speed positive drive state.

6. The variable speed automatic torque converter transmission of claim 5, wherein said sprocket means drive fixed to said variable pulley hub member is fastened by bolt means fastened through a flange on a hub extension of said sprocket means, on through one of said hub plates and on into one end of said hub member.

7. The variable speed automatic torque converter transmission of claim 6, with rotational mounting of said variable pulley and said sprocket means as an assembly on spindle means mounted on said pivotal mount member.

8. The variable speed automatic torque converter transmission of claim 7, with said pivotal mount member mounting drive chain length maintaining means through the range of pivotal movement of said pivotal mount member.

9. The variable speed automatic torque converter transmission of claim 8, wherein said drive chain length maintaining means includes a cluster of three sprockets with one being said sprocket means as a first sprocket driven member, and the other two cluster sprockets as idlers in maintaining the chain at constant length.

10. The variable speed automatic torque converter transmission of claim 9, wherein said cluster of three sprockets are positioned for application of high torque from said drive chain driving said first sprocket and with increased tangential force applied by the chain with pivoting of said pivoted mount member increasing the center distance between said variable pitch pulley and said fixed position pulley.

11. The variable speed automatic torque converter transmission of claim 10, wherein said transmission is mounted on a bicycle frame; and said drive sprocket is a bicycle pedal driven drive sprocket; and said power drive means are bicycle pedals driven by a rider of the bicycle.

12. The variable speed automatic torque converter transmission of claim 11, wherein said output toothed pulley is fixed to an output shaft rotatably mounted on the bicycle frame; an output sprocket is fixed to said output shaft; the bicycle has a rear wheel drive sprocket; and a conventional bicycle chain extends from said output sprocket to said rear wheel drive sprocket.

13. The variable speed automatic torque converter transmission of claim 1, wherein said transmission is mounted on a bicycle frame; and said drive sprocket is a bicycle pedal driven drive sprocket; and said power drive means are bicycle pedals driven by a rider of the bicycle.

14. The variable speed automatic torque converter transmission of claim 13, wherein said output toothed pulley is fixed to an output shaft rotatably mounted on the bicycle frame; an output sprocket is fixed to said output shaft; the bicycle has a rear wheel drive sprocket; and a conventional bicycle chain extends from said output sprocket to said rear wheel drive sprocket.

15. The variable speed automatic torque converter transmission of claim 13, wherein said opposite side sheeve members of said variable pitch pulley are maintained in rotationally fixed position for rotation with said hub member by rotational interlock means between each of said sheeve members and said hub member.

16. The variable speed automatic torque converter transmission of claim 15, wherein said sheeve to hub member rotational interlock means do not interfere with toothed engagement of the internal teeth of said "V" belt with teeth of said hub member when said "V" belt is moved to the high torque low speed positive drive state; and wherein said resilient bias means includes a plurality of resiliently compressible springs for each sheeve member biasing the sheeve members toward each other; hub plates are mounted to each end of said hub member; a plurality of spring mounting pins connected to each hub plate; and with the springs mounted on respective spring mounting pins extended into openings in the hub section of the opposite side sheeves and resiliently compressed between respective sheeve members and the adjacent hub plates.

17. The variable speed automatic torque converter transmission of claim 16, wherein said sprocket means drive fixed to said variable pulley hub member is fastened by bolt means fastened through a flange on a hub extension of said sprocket means, on through one of said hub plates and on into one end of said hub member.

18. The variable speed automatic torque converter transmission of claim 17, with rotational mounting of said variable pulley and said sprocket means as an assembly on spindle means mounted on said pivotal mount member; and with said pivotal mount member mounting drive chain length mainting means through the range of pivotal movement of said pivotal mount member.

19. The variable speed automatic torque converter transmission of claim 18, wherein said drive chain length maintaining means includes a cluster of three sprockets with one being said sprocket means as a first sprocket driven member, and the other two cluster sprockets as idlers in maintaining the chain at constant length.

20. The variable speed automatic torque converter transmission of claim 19, wherein said cluster of three sprockets are positioned for application of high torque from said drive chain driving said first sprocket and with increased tangential force applied by the chain with pivoting of said pivoted mount member increasing the center distance between said variable pitch pulley and said fixed position pulley.

* * * * *